March 8, 1966   L. R. HENDERSON   3,238,857
SYSTEM FOR MANUFACTURING MAPS
Filed Nov. 30, 1962   3 Sheets-Sheet 1
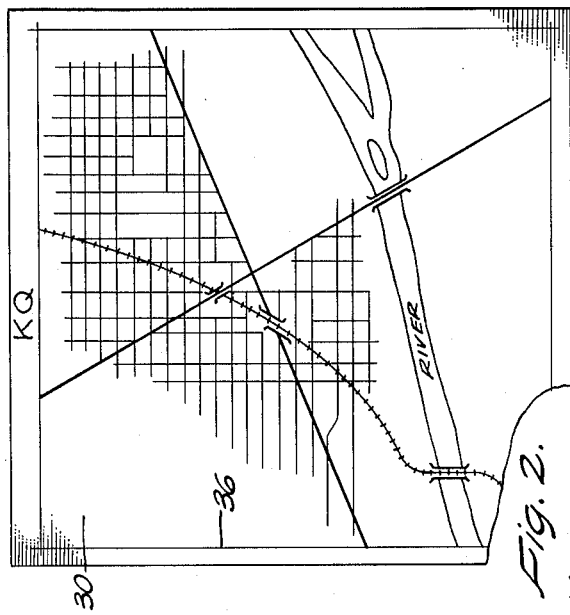
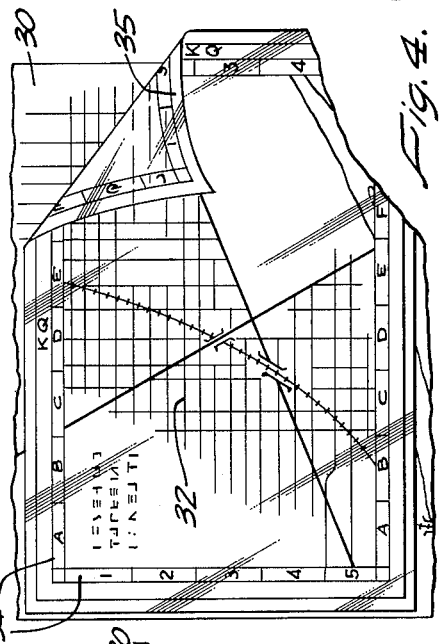
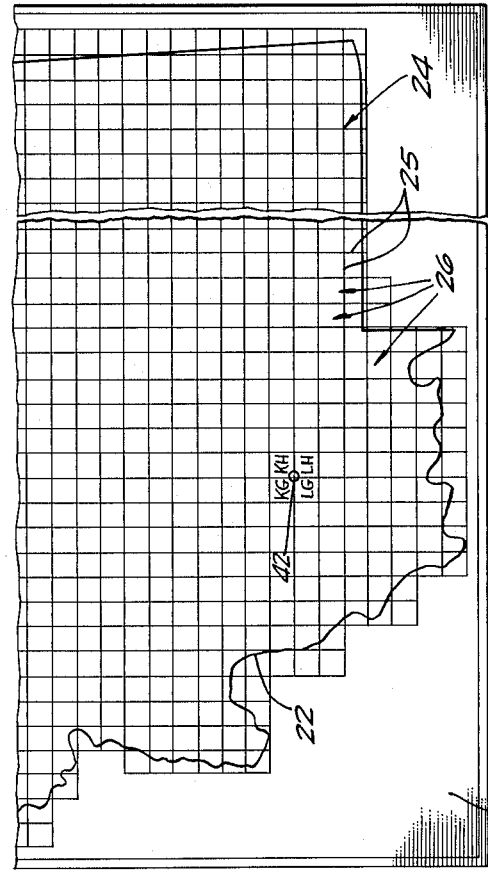
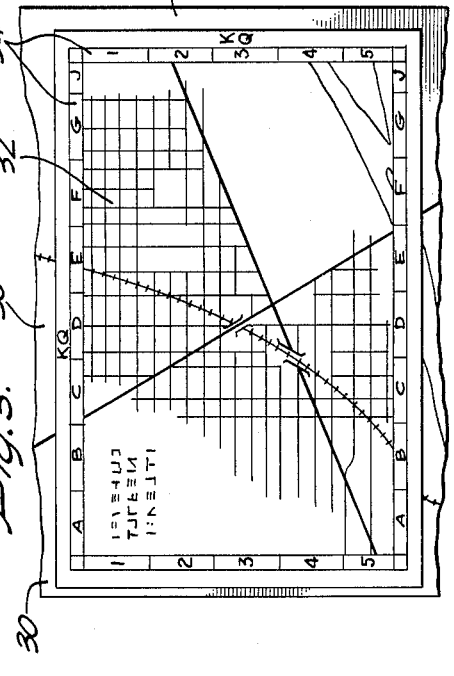
LESLIE ROBERT HENDERSON
INVENTOR.
BY
ATTORNEY March 8, 1966 L. R. HENDERSON 3,238,857
SYSTEM FOR MANUFACTURING MAPS
Filed Nov. 30, 1962 3 Sheets-Sheet 2
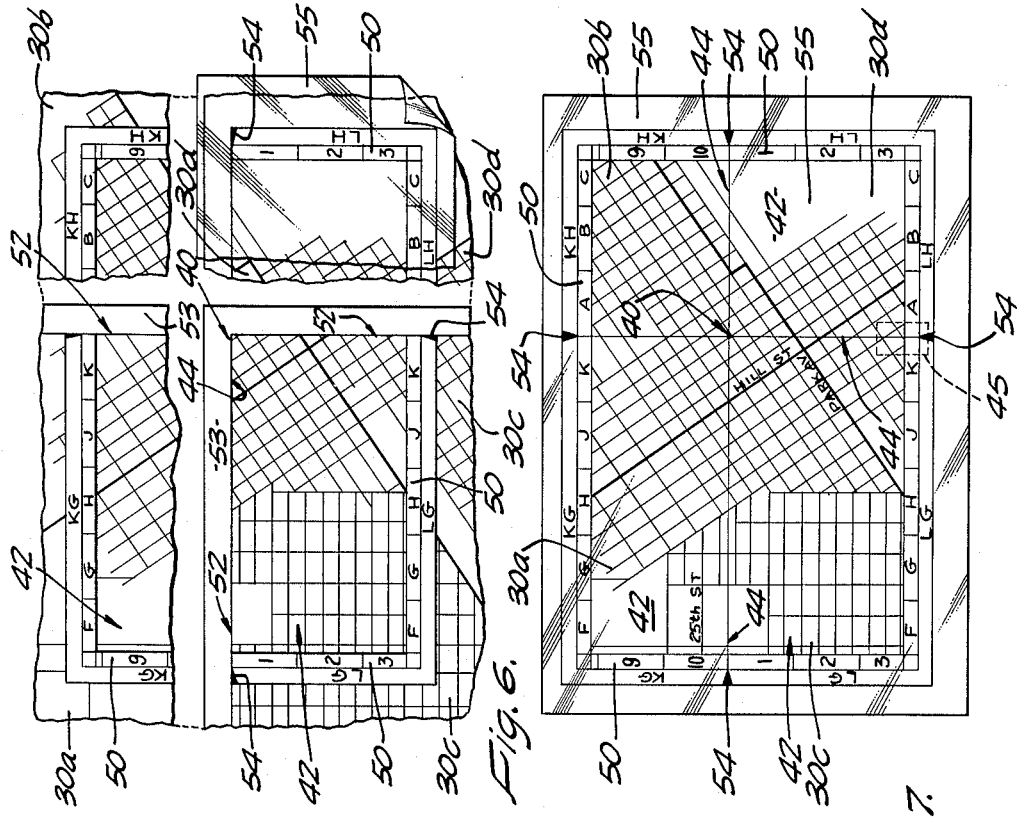
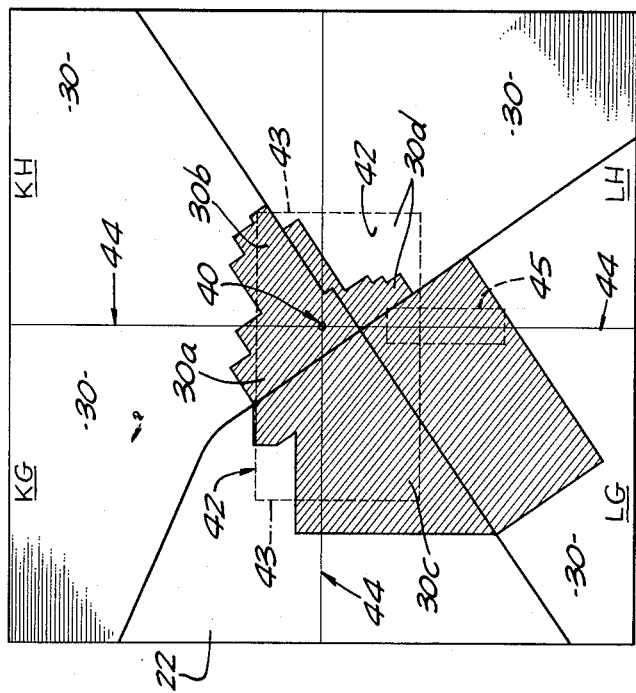
LESLIE ROBERT HENDERSON
INVENTOR.
BY
ATTORNEY March 8, 1966 L. R. HENDERSON 3,238,857
SYSTEM FOR MANUFACTURING MAPS
Filed Nov. 30, 1962 3 Sheets-Sheet 3
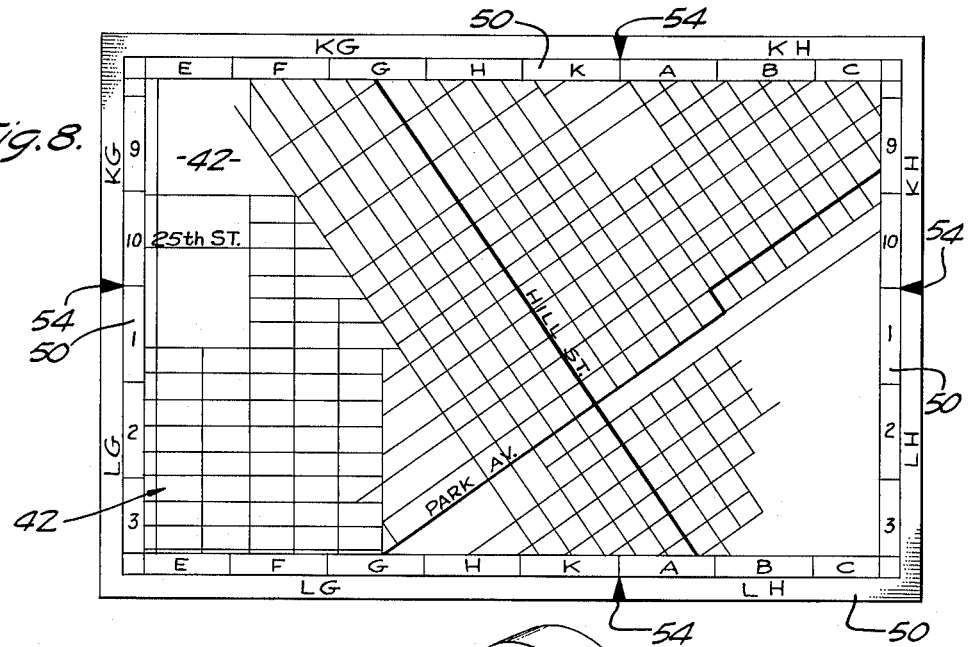
Fig. 8.
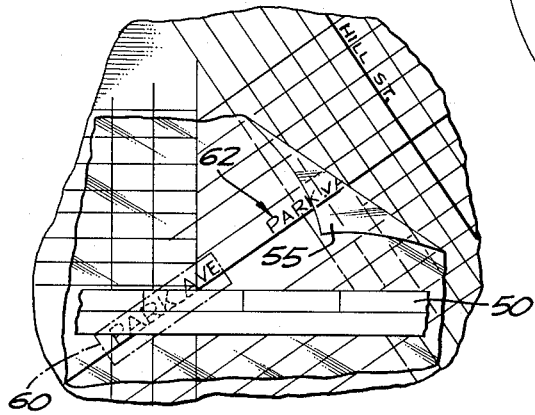
Fig. 9.
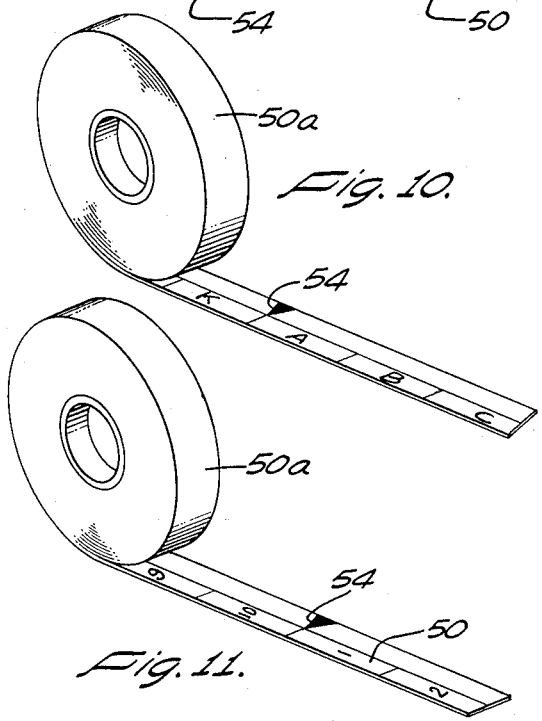
Fig. 10.
Fig. 11.
Fig. 12.
LESLIE ROBERT HENDERSON
INVENTOR.
BY
ATTORNEY

United States Patent Office 3,238,857
Patented Mar. 8, 1966

3,238,857
SYSTEM FOR MANUFACTURING MAPS
Leslie Robert Henderson, Los Angeles, Calif., assignor to Western Map Company, Glendale, Calif., a corporation of California
Filed Nov. 30, 1962, Ser. No. 241,203
6 Claims. (Cl. 95—1)

This invention relates to improved systems for manufacturing printed or other maps in sheet or other form. More particularly, the invention relates particularly to the manufacture of street maps and the like.

Sheet maps of the kind that are commonly employed to represent geographical areas such as parks, cities, states, and the like, utilize coordinates at the borders to aid users in locating street names or other legends on the maps. Many such maps are segments of detail maps of a larger area. Many others of such maps are composite maps prepared from detail maps of areas that constitute segments of the larger area represented in the composite map. In systems that have heretofore been employed for making such maps, the detail maps from which they are made have usually been made to individual or arbitrary scales that just happened to be convenient to employ at the time that the individual detail maps were made. Sometimes such detail maps have been drawn to the same scale. In order to make a composite map from detail maps drawn to different scales, the various detail maps have been first reproduced photographically so that the reproductions are on a common scale. Then the reproductions of the detail maps have been assembled to form a composite map; even when the detail maps have already been drawn to the same scale, they are photographed and the reproductions are assembled together to form a composite map. Then in a typical procedure of the prior art this composite map has been reproduced to provide a brown-line reproduction. Then, in the prior art, the various coordinate symbols that are to be employed to locate legends in the final composite map are drawn or written by hand together with a border along the sides of the brown-line print. A second or final negative has then been made by photographing the brown-line print with the hand-drawn borders and key symbols. This negative has then been employed to produce the final printed sheet map by printing by some suitable process.

Both in the prior art systems and in this system, sheet maps are made in large quantities from such final negatives to cover various geographical areas in accordance with the requirements of individual customers who then sell or otherwise distribute the sheet maps to final users.

An object of this invention is to provide an improved system for making maps in which only one negative is made for production of the final map, thus eliminating many of the steps employed in prior methods for making final maps from detail maps.

It is also an object of the present invention to provide an improved method for applying coordinates to the borders of final maps made from detail maps that have been made previously.

Other objects of the invention and the various features thereof will become apparent to those skilled in this art upon reference to the following specification and accompanying drawings.

In the drawings:

FIGURE 1 is a plan view showing a master control map of a major mapped area, representing in this instance a portion of a state, this control map being ruled off into a grid formation of uniform sections successively carrying distinguishing designations which may be in code style, the length of each zone representing a standard number of miles;

FIG. 2 is a plan view on a much enlarged scale of a detail base map of a selected section of the control map of FIG. 1, this enlarged scale base map representing a section of the control map and carrying in marginal portions the code designations of the map section represented;

FIG. 3 represents the positioning of an index border on a chosen portion usually representing less than all of the detail base map;

FIG. 4 illustrates the use of a transparent sheet which is an overlay to which the index border is affixed and then laid in the same position as that of FIG. 3, and through which photographic reproduction may be made to yield identical final reproductions as when printed or otherwise duplicated;

FIG. 5 indicates the making of a composite map of an area extending into four of said master control map sections;

FIGS. 6 and 7 indicate succeeding steps following that of FIG 5;

FIG. 8 represents a photographic reproduction from FIG. 7 from which the final map is produced, and is also representative of the final map itself;

FIG. 9 represents an index which will be printed with the map of FIG. 8;

FIGS. 10 and 11 show rolls of border strips carrying the coordinates employed at the map borders; and FIG. 12 indicates a correction procedure for legends which are broken at map edges in the bordering step.

As explained hereinafter, this invention involves master control maps, primary or base detail maps, and final maps. Some of the final maps are composite maps, formed from an assemblage of the detail maps. As will appear, the master control map is divided into rectangular or square sections representative of areas of predetermined width and length. For convenience, these areas are often referred to herein as sections, or map sections. Additionally, it is sometimes desirable to refer to latent subdivisions of these areas as subsections or map subsections. While the sections on the master control map are usually delineated by vertical and horizontal grid lines, the subsections on the final maps are not so designated, but are merely locatable by reference to interval coordinates printed along the borders of the final maps.

Thus, as used herein, the term section as applied to a map is to be construed as referring to a part of a map of predetermined area and shape and is not intended to refer to a square mile area in the sense that the term section is generally employed in the science of surveying. Likewise, the subsections themselves will generally represent a square mile. But in any event, in the best embodiment of the invention, a subsection will be square and will be a mile, or other unit of measurement, or an integral fraction thereof along each edge. Thus, the sides of the ground area represented by a map subsection will generally have a length of one mile. Likewise, a map section will be square and each side will generally represent five miles or ten miles of the geographical area represented on the map.

As illustrated in FIG. 1, a master control map sheet 20 is employed upon which is delineated the outline of a map 22 of a comparatively large area on a relatively small scale. By way of example, this particular map 22 represents a part of the State of Montana. On this map 22 there is inscribed, in accordance with this invention, a grid 24 formed by horizontal and vertical lines 25 enclosing a plurality of map sections 26. These sections, or zones, or divisions, are dimensioned to represent a predetermined integral number of miles on each side. The length of each side generally represents more than one mile, such as five miles or ten miles. In the present example, each side of each square section 26 is scaled to represent ten miles. Also the sections are respectively designated in any suitable manner, such as by the code or coordinates indicated, starting for example with AA in the north-west corner and continuing in any appropriate manner through the area of the master map 22. Thus, the section 26 indicated by KQ in FIGS. 2, 3, and 4, by way of example, is assumed to include the city of Billings.

The square section KQ is also mapped on translucent paper on an enlarged scale in a detail map, such as represented by FIG. 2, where it is indicated at 30, and each side is drawn on a scale representing ten miles long as before. The largest dimension of this city, however, is much smaller than ten miles. For this reason, only a portion of the section need be shown on a map of the city. As seen in FIG. 3, the area to be mapped is only about 5 miles from top to bottom, and 8 miles from side to side. For indexing purposes, each one mile interval that extends from side to side, that is in an east-west direction, is presented by a distinguishing capital latter, and each mile interval that extends from top to bottom, that is in a north-south direction, is represented by a distingishing integer. The letters thus represent horizontal coordinates of vertical bands while the integers represent vertical interval coordinates of horizontally extending bands. The intersection of a vertical band with a horibontal band defines a subsection that is identified by the two band coordinates. Usually these border strips are cut from an elongated printed strip that may be stored in the form of rolls. Thus, two types of rolls are used, as shown in FIGS. 10 and 11, one bearing the distinguishing letters A, B, C, D, E, F, G, H, J, and K representative of horizontal coordinates, and one bearing the distinguishing integers 1, 2, 3, 4, 5, 6, 7, 8, 9, and 10 representative of vertical coordinates. On such continuous rolls, the respective coordinates are repeated over and over. Whenever a border strip representing specific coordinate intervals is to be formed it is cut from the corresponding roll.

In order to produce the desired map portion for the city which is represented at 32 in FIGS. 3 and 4, a prepared scaled indexing border strip 34, which previously has been printed on paper or otherwise suitably prepared and arranged to the required size, is overlaid upon the map 30 (FIG. 2) of the zone KQ to outline the desired map portion 32 as in FIG. 3.

In the best mode of practicing this invention, however, this border strip is first cemented or otherwise secured to a flexible transparent sheet 35 as shown in FIG. 4, whereby the relative position of the printed border pieces for the four-sided border 34 is maintained and through which the desired map portion 32 is visible. Such a sheet 35 may be any currently known flexible plastic sheet of adequate stability and transparency under varying ambient conditions of temperature and humidity. Alternatively, though less satisfactory, the strip may be placed on a brown-line print or other print made from a preliminary photographic negative of the detail map 30 as shown in FIG. 3.

In these instances, all of the map 32 is wholly within the boundary or margin line of the detail map 30 indicated in FIG. 2 at 36.

The next map making step consists in the photographing of the arrangement of FIG. 3 or FIG. 4, or at least so much of the map structure as is contained within the applied border strips 34. The resultant photographic film or other copy is then employed in any conventional manner for reproduction to yield corresponding finished map products such as printed map sheets.

The making of the map product also includes the preparation of an index to print on the sheet map or an accompanying sheet, as indicated in FIG. 9.

This map-making system is, of course, not limited to the production of a map from a single section of the master control map 20, such as above described in connection with the section KQ. It is especially applicable also to the preparation of an integral composite map from adjoining sections or zones, such as two sections lying side by side or four sections meeting at their common corner. For example, a map may be prepared covering Helena, Montana, represented as lying in four sections of the master control map of FIG. 1. Such a situation is represented in FIGS. 5, 6, and 7 where it is indicated that four cornering sections KG, KH, LG, and LH are involved. Here, a portion of each of these four sections arranged around their common corner 40 is to be shown on the same final composite map. For this purpose, detail base maps 30 of all the sections KG, KH, LG, and LH are employed. FIG. 5 is generally indicative of this situation. In FIG. 5, and also in FIGS. 6 and 7, the portions of the base maps 30 of the sections KG, KH, LG, and LH to be used in making the composite map are respectively indicated as 30a, 30b, 30c, and 30d.

Thus, FIG. 5 represents, on a larger scale than FIG. 1, the four sections KG, KH, LG, and LH shown in the master control map 22 of FIG. 1 as containing the City of Helena, parts of which are included in sections arranged around their common corner 40. There is also indicated in FIG. 5 a map assembly 42, defined by dotted lines 43, and constituting the portions of these sections which are required for a final composite map produced by processes represented in part by FIGS. 6 and 7. FIG. 5 is also appropriately indicative, within the dotted lines 43, of negative film portions to be prepared from each of the detailed base maps 30 of the four sections KG, KH, LG, and LH, such negative portions being trimmed and arranged in abutting relationship along meeting edges as indicated by lines 44 in FIGS. 5 and 7. At the same time, FIG. 5 is indicative of the possible use of trimmed prints (instead of film negatives) of each of the base maps 30 of the indicated four sections KG, KH, LG, and LH fitted together around their common corner 40, and from which assembly so much thereof is photographed as is desired for the final composite map 42 shown in FIG. 8. Thus, the area 42 of either FIG. 5 or FIG. 7 corresponds to either trimmed photographic film negatives to be arranged around the common corner 40, or to trimmed paper prints fitted around such common corner 40.

The making of individual photographic negatives from individual detail maps for building up an assembly using portions 30a, 30b, 30c, and 30d of the large detail base maps 30 of the various sections KG, KH, LG, and LH, is represented in FIG. 6. Here, the initial step is indicated in connection with section LG in the lower left-hand quadrant, the other three sections being fragmentarily illustrated in properly aligned relationship to show the relations of the individual section to the whole map 42 desired in the final product.

Thus, an indicated in said lower left quadrant of FIG. 6, appropriate border strips 50 are superimposed directly upon the map section 30c of the section LG. These border strips are disposed within a boundary line or margin line 52 of the map portion 30c, and the strips 50 terminate at such margin lines 52. Such margin lines serve to define around each section map area a blank border area 53 of the detailed base map. Border strips 50 are likewise arranged upon the map portions 30a, 30b, and 30d for the sections KG, KH, and LH respectively.

One type of these individual border strips 50 is shown in greater detail in FIGS. 10 and 11 where they are indicated as being conveniently supplied in rolls 50a. To provide suitable indications of division lines or boundary lines between the various sections involved, such as between sections LG and KG and KG and KH, the border strips 50 are printed with notch or wedge indications 54. If the strips are cut at the indications 54, one-half of the wedge-shaped marking will remain which, when abutted against the end of a complementary border strip 50, will display the full wedge or notch, as best indicated in FIGS. 7 and 8.

There are two methods of superimposing the border strips 50 upon the map section 30c of the section LG. In one, such border strips 50 are directly laid upon the map portion as just described. In another, the border strips 30c are affixed to a transparent sheet 55 which is overlaid upon the map portion as indicated in connection with the section LH in the lower right quadrant of FIG. 6. Usually one method or the other is employed in the making of any one composite map. Such transparent sheets 55 are employed in the same manner as the sheet 35 of FIG. 4.

A photographic film is now made for each of the map portions to which border strips 50 have been applied, as above described. When completed, these photographic films, which are represented by FIG. 7, are trimmed at the margin lines 52 to eliminate the blank margin strips 53, and also to eliminate map portions outside the border strips 50. These trimmed negatives are now arranged around their common corner 40, as in FIG. 7. It is to be noted that upon each of the border strips 50 the respective indications for the sections LG, LH, KG, and KH, will have been applied. It is further to be noted that the border strips are printed with the numerals on the vertical strips and letters on the horizontal strips to represent the coordinates, and that the numerals beginning at 1 extend downward from the top or north edge of a section map toward the bottom, terminating with the numeral 10 at the bottom or south edge of the section map from which the various sections such as 30c and 30a are taken. Similarly, the letter coordinates begin with A at the left or west edge of the section map and terminate with K, for example, at the east edge of a section map. Thus, when the respective negatives are assembled around their common corner 40 indicated in FIG. 7, the proper coordinate relationships of the assembled portions of the sections KG, KH, LG, and LH appear. By uniform marking of the borders, subsections having congruent locations in the various sections are always locatable by means of the same border symbols.

When the photographic film negatives properly trimmed, as above indicated, have been prepared and arranged around their common corner 40, as in FIG. 7, they are suitably connected in abutting relationship, any appropriate means being employed. Such means might be attachment strips such as indicated in broken lines at 45, applied to the undersides of the films; these strips 45 should be clear and transparent. From such an arrangement a suitable photographic reproduction of the composite assembly is made, as indicated in FIG. 8. The result may be a photolithographic plate from which the final composite map product, also represented by FIG. 8, is produced.

If preferred for any reason, a less desirable procedure may be followed which has been alluded to above. This involves making prints of the portions of the various maps 30 for the mentioned sections KG, KH, LG, and LH, trimming those prints, arranging them about their common corner 40 in the manner indicated in FIG. 7, then applying the border strips 50, either with or without the overlaid transparent sheet 55, as above described in connection with FIG. 4 and the lower right quadrant of FIG. 6. This assembly of the indicated prints, which corresponds with the similar assembly of the negative previously described in connection with FIG. 7, is now subject to photographic reproduction, such as by the mentioned photolithographic method, whereby to print the final map product required. Thus, there is provided by either of the systems represented by FIGS. 5, 6, and 7, a final map assembly of the four sections indicated, each having an indexing border with indexing coordinates and code symbols to correspond with the master control map 22 and with the respective detail base maps.

Thus, the respective border portions carry the described alphanumeric coordinates and also the section designations KG, KH, LG, and LH, each of these appearing on appropriate edge portions of the final composite map. Since, in the case represented by this example, the resultant map includes only a portion of each of the indicated sections, the indexing border portions will each cover less than ten miles. Thus, transversely, that is from east-to-west or side-to-side, each of the sections KH and LH may be only around three miles, whereas the sections KG and LG may be around five miles transversely. Similarly, vertically, that is from north-to-south or top-to-bottom, the section portions KG and KH may be around two miles, while the section portions LG and LH may be around three miles, somewhat as indicated. Since each of these indexing border pieces is divided to represent one mile, and since the indexing characters or coordinates correspond with the mile intervals of the original zones, the resultant map 42 within the border strips 50 (FIGS. 6 and 7) will be scaled to correspond with the master control map 22 of FIG. 1.

As previously described, in order to facilitate following the relationships among the four sections here represented as KG, KH, LG, and LH, printed notch indications 54 or equivalent indicia are printed in the border strips 50 at the outward ends of the adjoining edge lines 44, as indicated in FIGS. 6 and 7.

In FIG. 12 there is indicated a means for correcting or for partially blocking out of a street name or other legend when a border strip 50 is applied. For this purpose, an opaque masking strip 60 is applied to the transparent sheet 55 in a position of sufficient size to block out portions of a legend remaining, such as the letters VE. Then, the legend 62 of the street is applied to the transparent sheet 55 so that it is clear of the border strip 50.

An index is prepared for the composite map; the index from the resultant map including not only the transverse letter indications or coordinates and the vertical number indications or coordinates, but also including the respective section indications KG, KH, LG, and LH. The resultant printed maps will, of course, be like the arrangement appearing within the border 50 in FIG. 6 and including both the border 50 and the map assembly 52 within the border.

The map of this invention includes not only the graphical representation of the area as shown for example in FIG. 8, together with legends of various features of the terrain in that area, but also an index to such legends. Such an index includes an alphanumeric listing of the legends represented in the map. A portion of such alphanumeric index is indicated in FIG. 9, where it will be noted that a trinomial code symbol is associated with each of the legends thereby indicating the location of the legends on the map. The prefix of each trinomial symbol indicates the section in which the legend is located and the suffix represents the coordinates of the subsection in which the legend is located in that section. Thus, for example, the JP-10K is the trinomial symbol corresponding to Park Av. This symbol indicates that the legend "Park Av" is located in the subsection having the coordinates 10 and K of section JP. Similarly, other legends are readily located on the map. This system of trinomial indexing is particularly applicable to composite maps made up from sections or parts of sections to form the required composite map. Such a map together with the best mode now known for indexing are disclosed and claimed in copending patent application Serial No. 241,388 filed by Francis O. Holm on November 30, 1962.

While the invention has been described particularly with reference to the legends representing names of streets, it is also applicable to maps which include legends indicative to other geographical features. In the best embodiment of the invention, the various border strips are fastened to a transparent sheet which is subdivided as described to overlay appropriate sections and parts of sections that are to be represented in the composite map. With this arrangement, only one photographic negative is produced prior to the formation of the final photolithographic plate. However, this invention is also applicable to an arrangement in which brown-line prints or other preliminary prints of the various sections are formed and the border strips are applied to those preliminary photographic reproductions.

From the foregoing, it will be apparent that with the uniformly dimensioned border system as represented by the border 34 of FIGS. 3 and 4, and by the border 50 of FIGS. 6 and 7, having once indexed a map area with the transverse and the vertical coordinate system indicated, wherein the units are in miles, and having once prepared a detailed base map for any given area as represented by the indicated ten-mile square sections, it is unnecessary to redraw such a detail base map for different customers, or in fact, even for the same customer when he desires a change in the extent of the area to be represented in the final map. Further, by preparing the detail base map, as is done here, on the basis of 1320 feet to the inch, that is, four inches to the mile, the scaled relationships on the original detailed base maps 30 are always constant, and since these maps need never to be redrafted, new drafting of any given map is never required. Only additions of new roads, parts, bridges, and the like will be needed.

Further, removable map borders represented at 34 and 50, and which are producible as required from standard borders which always represent miles to the same scale, that is, vertically by ten integers 1 to 10 and horizontally by ten letters as chosen (such as A to K with the letter I omitted), the border also always is constant. Thus, these standard borders may be printed in large quantities, and then cut to whatever lengths are required for individual jobs, beginning with whatever letter or number is required. Under these circumstances, only the code number of the zone or section of the master control map needs to be separately applied to the respective border strips.

The present system is therefore based upon an overall permanent control which can be applied to every locality, whether it be city, county, or other district, consisting of sections of uniform size and shape on the master control map. Additionally, since it is based upon detail maps of various sections drawn to the same scale, and border strips representing mile intervals to the same scale, e.g. squares or rectangles, the complete map records of the map maker are so interrelated as to facilitate manufacture of final maps using such border strips. These improvements simplify the system and greatly reduce costs of manufacture of maps. While sections ten miles square have been mentioned, it is obvious that the sections could be five miles square, or they might be five miles by ten miles, or other dimensions.

Thus, as indicated, the master control map of the larger areas, and the detailed base maps of individual zones, or kindred small areas, constitute key or base maps which remain constant, until they are required to be altered, as by addition of subdivisions or new roads or the changing of roads or the like.

While the invention has been described with reference to only specific embodiments thereof, it will therefore be understood that the invention may be applied in many other ways within the scope of the appended claims.

What is claimed is:

1. In a map making method:
dividing a map of relatively large area and small scale into a plurality of sections of substantially uniform size and shape on a given mileage scale to yield a master control map;
applying distinguishing designations to said sections of said master control map;
producing detail base maps of adjacent chosen sections of said master map, said detail maps being produced to a uniform scale;
selecting a continuous area to be mapped from the area of said adjacent sections, at least part of each such section lying in the selected area, at least parts of some of said sections lying on the boundary of said selected area;
laying beside a portion of each such detail base map of a section lying on the boundary of said selected area a border strip carrying indexing characters arranged on said uniform scale for indicating interval coordinates of subsections of said sections, each said border strip also carrying the section designation appropriate to the base map beside which it is laid;
duplicating said border strips and the adjacent said portions of said detail base map to yield a desired map product, said duplicating comprising the steps of
fastening such border strips to transparent sheets, laying the transparent sheets over the respective portions of said detail maps to be incorporated in a composite map of said selected area, and making photographic copies of said border strips and said portions of said detail maps.

2. In a map making method:
dividing a map of relatively large area and small scale into a plurality of sections of substantially uniform size and shape on a given mileage scale to yield a master control map;
applying distinguishing designations to said sections of said master control map;
producing detail base maps of adjacent chosen sections of said master map, said detail maps being produced to a uniform scale;
selecting detail maps of sections that lie within a continuous area to be mapped from the area of said adjacent sections, at least part of each such selected section lying in the selected area, at least parts of some of said selected sections lying on the boundary of said selected area;
laying beside portions of detail base maps of selected sections that lie on the boundary of said selected area, a border strip carrying indexing characters arranged on said uniform scale for indicating interval coordinates of subsections of selected sections, each said border strip also carrying the section designation appropriate to the detail base map beside which it is laid;
placing said selected detail base maps in side-by-side relation in accordance with the relative positions thereof in said selected area with said border strips laid beside said portions; and
duplicating on a common sheet said border strips and the portions of said detail base maps that represent said selected area with the duplicates of the border strips beside the duplicates of said portions of said maps to yield an integral composite map of said selected continuous area.

3. A map making system including:
a master control map of small scale covering a large area ruled on a substantially uniform grid system, having distinguishing designations indicating corresponding sections;
a plurality of detail base maps representing a plurality of said sections of said master control map and on a common enlarged scale;
indexing border strips arranged on the scale of said base maps, the lengths of said indexing border strips bearing series of interval coordinates spaced thereon to the same scale as said base maps; and
said master control map and said detail base maps and said border strips being separate from each other, said base maps being adapted for arrangement in side-by-side relation in accordance with the arrangement of corresponding sections on said control map, and said border strips being adapted for arrangement beside chosen border portions of adjacent parts of said base maps corresponding to a continuous area represented on said control map.

4. A map making system as in claim 3, wherein said border strips are of such lengths as to provide borders for selected portions of said base maps, which selected portions cover a predetermined continuous area mapped in a plurality of said detail base maps.

5. A map making system as in claim 4, wherein said border strips are mounted on a transparent sheet.

6. A map making system as in claim 5, wherein said border strips carry the section designation of the respective sections representing parts of said continuous area.

References Cited by the Examiner

UNITED STATES PATENTS 666,788   1/1901   Aberli ---------------- 95—85

OTHER REFERENCES

Road Map of New York, published in 1948 by Rand, McNally and Co., for Sunoco Oil Co.

JOHN M. HORAN, *Primary Examiner.*

NORTON ANSHER, *Examiner.*